No. 888,742. PATENTED MAY 26, 1908.
F. T. RICHTER.
SAFETY GAS COCK.
APPLICATION FILED JAN. 14, 1907.
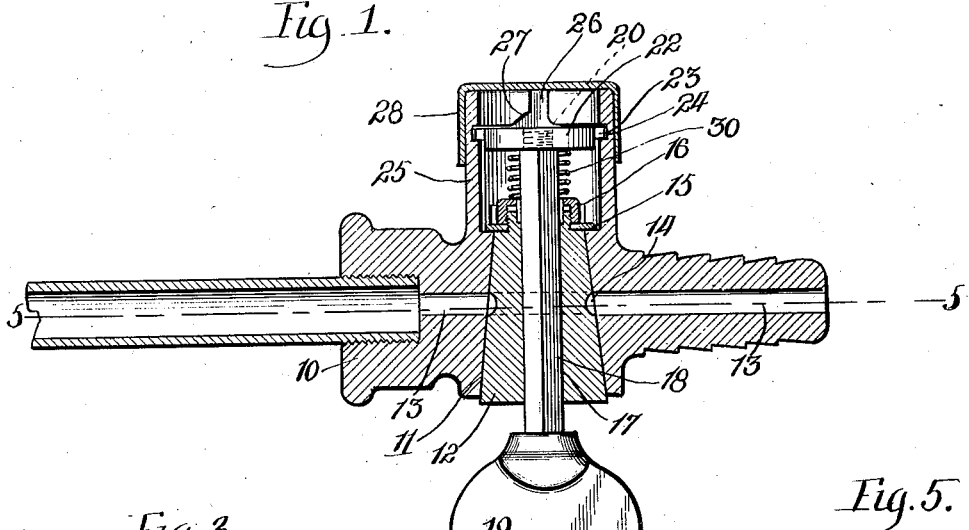
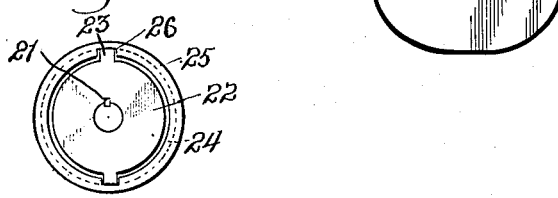
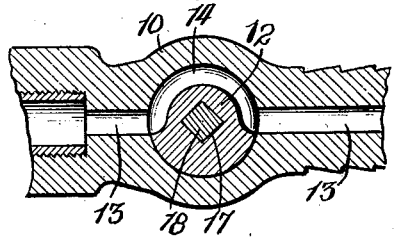
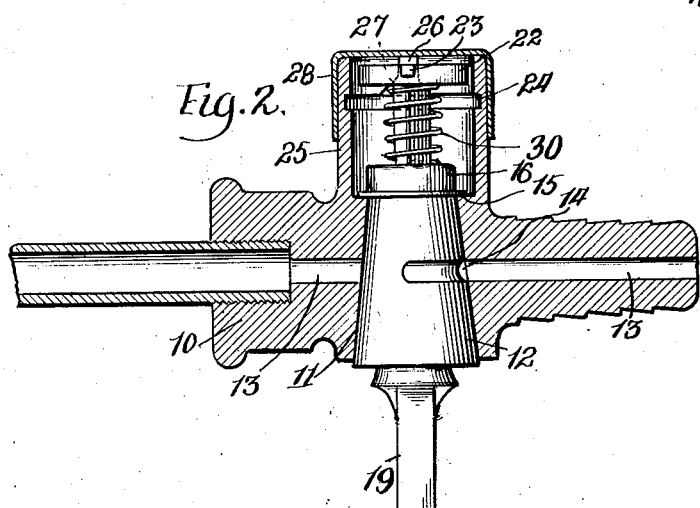
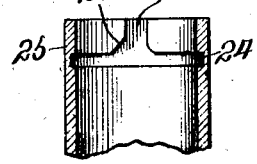
Witnesses:
Inventor:
F. T. Richter
By Fred Gerlach
his Attorney.

UNITED STATES PATENT OFFICE.

FERDINAND T. RICHTER, OF NEW YORK, N. Y.

SAFETY GAS-COCK.

No. 888,742.
Specification of Letters Patent.
Patented May 26, 1908.

Application filed January 14, 1907. Serial No. 352,114.

*To all whom it may concern:*

Be it known that I, FERDINAND T. RICHTER, a resident of New York, in the county of New York and State of New York, have invented certain new and useful Improvements in Safety Gas-Cocks, of which the following is a full, clear, and exact description.

The invention relates to safety-cocks.

In gas-valves it is desirable to lock the valve-plug against accidental or inadvertent shift to prevent escape of gas which so frequently produces fatal results.

The invention designs to provide a safety gas-cock of improved construction and more particularly one in which the valve-plug is locked against rotation and which is at all times in engagement with its seat so there is no more likelihood of leakage than in the common tapered ground-fit plug of the usual form.

The invention also designs to provide a safety gas-cock which is simple in construction and can be produced at a low cost.

The invention consists in the several novel features of construction hereinafter set forth and more particularly defined by claim at the conclusion hereof.

In the drawings: Figure 1 is a vertical section of a safety-cock embodying the invention. Fig. 2 is a similar view, the collar being raised in locked position. Fig. 3 is a detail plan, the cap for the valve being removed. Fig. 4 is a detail section of the sleeve extension of the valve, and Fig. 5 is a section on line 5—5 of Fig. 1.

A valve-casing or body 10 is provided with the usual conical seat 11 to which is fitted a tapered plug 12. Usual ports 13 extend from the valve-seat to the ends thereof and the plug is provided with a semi-circular peripheral groove 14, adapted to establish communication for the passage of gas through the valve-body as well as to interrupt it to control the flow of gas. A washer 15 and nut 16 are screw-threaded to the inner end of the plug to hold the valve snugly in engagement with the valve-seat.

A hole 17 extends longitudinally and centrally through the valve-plug and through said hole extends the stem 18 of a key 19. The stem is rotatably connected to the plug, *i. e.*, the stem is non-circular or polygonal and the hole 17 is correspondingly shaped. The stem is also movable longitudinally in the plug-valve. To the upper end of the stem is secured, as by a screw-thread 20 and key 21, a collar 22 having projecting studs 23 which fit into a groove 24 formed in a sleeve-extension 25 secured to the valve-body. A spring 30 is interposed between collar 22 and nut 16 of the plug to press the key normally upward and into the notches 26 communicating with the groove in sleeve 24. Preferably the groove is beveled at as 27 to cause studs 23 to pass into notches 26, so the key and plug which are rotatably connected, will be locked against rotation and against accidental shift. A cap 28 fits over the sleeve extension to inclose the parts therein. The groove 14 in the plug extends around the periphery of the plug and does not communicate with the hole 17, and resultantly there is no possibility of leakage any more than in the usual valve, the plug being at all times held in its seat. The key passes through a square hole in nut 16, to secure the latter against rotation with respect to the plug.

In operation, the collar-studs 23 are normally held in notches 26 in sleeve 25 and the key and valve-plug are positively secured against rotation, the key being yieldingly held into locked position by spring 30. When it is desired to open the valve, the key 19 is withdrawn longitudinally, the stem 18 thereof being slidably held in the plug and said movement will cause collar-studs 23 to pass out of notches 26 and into the circular groove 24 when the key will be free to be rotated in either direction so the valve can be opened and regulated to supply the desired amount of gas.

The valve may be opened or closed by rotation of the key in either direction, a quarter turn being sufficient to bring the plug from open position into its locked position. When the valve is open, the spring 30 frictionally holds the key and plug against rotation by pressing studs 23 against the upper edge of the straight portion of groove 24 and if the key should be accidentally shifted when in open position the collar studs 23 will engage inclines 27 so the spring 30 will automatically force the collar-studs 23 into notch 26 and positively lock the valve.

The invention is not to be understood as restricted to the details shown and described since these may be modified without departing from the spirit and scope of the invention.

Having thus described the invention, what I claim as new and desire to secure by Letters Patent, is:

1. In a safety gas-cock, the combination of a valve-body provided with a sleeve, a valve-plug seated and rotatable in said body, a key having a stem longitudinally movable in the plug, said sleeve having a lock-groove on its inner periphery, and means on the key for engaging said groove to lock the plug and key against rotation.

2. In a safety gas-cock, the combination of a valve-body provided with a sleeve, a valve-plug seated and rotatable in said body, a key having a stem longitudinally movable in the plug, said sleeve having a lock-groove on its inner periphery, means on the key for engaging said groove to lock the plug and key against rotation, and a spring for yieldingly holding the key against longitudinal movement.

3. In a safety gas-cock, the combination of a valve-body, a rotatable valve-plug extending through said body and having a peripheral gas-port, a key rotatable with said plug and having a stem extending therethrough, means for locking said plug against rotation, and a spring for yieldingly holding said key against rotation.

FERDINAND T. RICHTER.

Witnesses:
   Thomas Gleason,
   David L. Woodall, Jr.